June 1, 1926.
J. B. HARLOW
1,587,121
REMOTE CONTROL AND SUPERVISORY SYSTEM
Filed Dec. 1, 1921
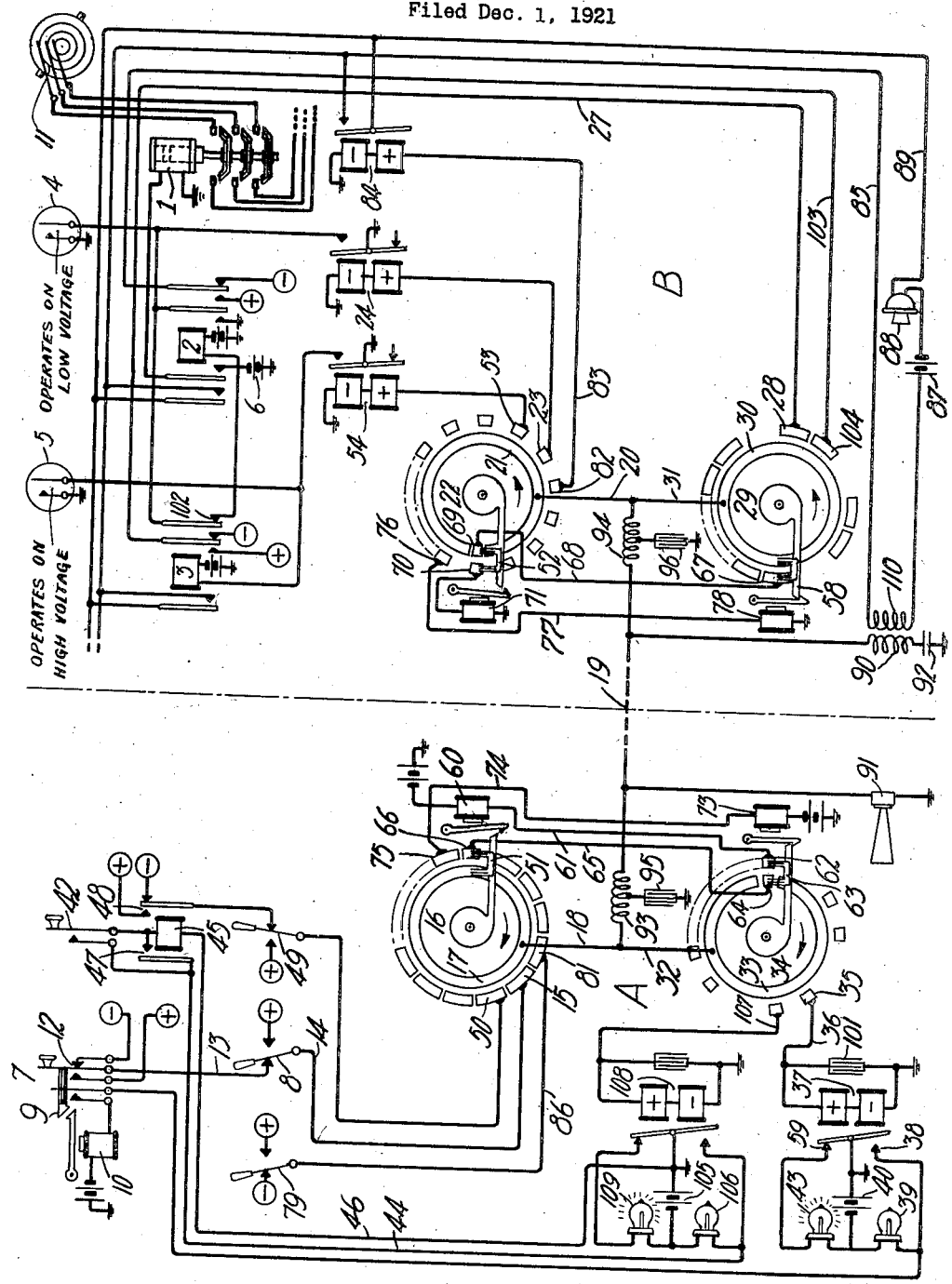
Inventor:
John B. Harlow.
by Jos. A. Palmer,
Atty.

Patented June 1, 1926.

1,587,121

UNITED STATES PATENT OFFICE.

JOHN B. HARLOW, OF UPPER MONTCLAIR, NEW JERSEY, ASSIGNOR TO WESTERN ELECTRIC COMPANY, INCORPORATED, OF NEW YORK, N. Y., A CORPORATION OF NEW YORK.

REMOTE CONTROL AND SUPERVISORY SYSTEM.

Application filed December 1, 1921. Serial No. 519,161.

This invention relates to electrical systems for the control and supervision of distantly located apparatus and has for its object the provision of such a system which is simple, positive and rapid in action, and inexpensive to install and maintain.

The present invention is especially adapted for use in selectively controlling and supervising a plurality of distantly located switches at power stations and the like from a central or controlling station.

It is thought that a brief description of a system with which the invention in one of its practical embodiments may be used to advantage, will assist in comprehending the nature and advantages of the invention. The system referred to is an electrical power distributing system for electrically operated railroads. Such a system includes a series of converter stations located at intervals along the right-of-way at which current is generated for consumption by the motive power within the track sections assigned to such stations. At each station there are a number of converter units which automatically start and stop depending upon load conditions. The starting and stopping is accomplished by electromagnetic switches controlled by relays which operate upon maximum and minimum line voltage. Thus, when the load becomes too great for one unit to carry, the line voltage lowers and the relay operating on minimum voltage performs the necessary functions to start up another converter unit to help carry the load. Other units at the station are similarly started until sufficient have been put in operation to carry the load. When the load has decreased, the units are cut out one by one by an operation of the relay operating on maximum line voltage. The relay mechanism does not operate to cut off a unit until a predetermined time interval has elapsed, usually about ten minutes, the purpose of which will be hereinafter described.

None of the substations is provided with an attendant and it is therefore desirable that means be provided for controlling the units from a central or controlling station so that any machine may be started and stopped at any time independently of its automatic operation, but as soon as it has been controlled from the control station that it be conditioned again for automatic operation. It is also desirable at times that the automatic operation of the units be prevented and the said units be entirely under the control of the controlling station. This invention in its preferred form provides a system by which these functions may be performed. It also provides supervisory means which automatically indicates at the control station, the state of the apparatus at the substation; and additional means for automatically rendering operative a telephonic system associating the controlling station and substation through which the operator may hear the various units as they start or stop.

Other objects and advantages will appear from the following description taken in conjunction with the drawing which diagrammatically represents one embodiment of the invention.

Referring to the drawing, A represents a station from which it is desired to control apparatus located at a remote station B. This apparatus may comprise a number of rotary converter units or similar devices.

An electromagnetic switch 1 controls one of a number of such rotary converters 11 and in turn is controlled by the operation of relay 2 or relay 3 which are associated with voltmeter relays 4 and 5, respectively. This circuit of relay 2 includes the normally closed contacts 102 of relay 3, so that when the latter relay is operated, the former cannot be energized. Voltmeter relay 4 operates to close the circuit of relay 2 when the line voltage drops to marginal minimum which occurs when a condition of high load exists on the line. Relay 5 closes the circuit of relay 3 when a condition of low load or high voltage exists on the line. When the relay 2 is energized, its left-hand inner contacts close the circuit from the source of current 6 through switch 1 to ground, operating switch 1 and starting the corresponding converter unit 11. When relay 3 is energized, it interrupts the circuit of relay 2, thereby breaking the energizing circuit of switch 1 causing it to release and automatically stop the rotary converter associated therewith. Relay 5 is regulated so that it does not operate until a predetermined time interval has elapsed. This time interval is usually arbitrarily fixed at about ten minutes since it is not desirable that the machine be stopped and then restored to service immediately thereafter when the load conditions vary rapidly. Very often the line load may fluctuate greatly for a short period, such as when a train stops at a station for a short period of time. Under such conditions it is desirable that the rotary converter be kept running in order to meet the load which subsequently follows.

In order to control the converters from the controlling station A, relays 2 and 3 may also be operated through polarized relays 24 and 54 associated with a system of rotary distributors and suitable switches at the controlling station. The rotary distributor system employed with the present invention is identical with the system disclosed in detail in a copending application of Joseph C. Field, Serial No. 508,443, filed Oct. 18, 1921, Patent No. 1,562,211, Nov. 17. 1925. The rotary distributors employed in this system have brush arms. which are frictionally mounted on continuously rotating shafts and which are arranged to be arrested periodically and then released through the instrumentality of the other distributor. However, the operation of the system is continuous, and the positions of the power switches are at all times communicated to the distant station. At the controlling station A, there are located service starting switch 7, and an emergency starting switch 8. Switch 7 is provided with an automatic locking device 9 which holds it in its operated position until the locking device is released by an electromagnet 10. In the normal or unoperated position of switch 7, negative current is supplied to a circuit including contact 12 of the switch 7, conductor 13, switch 8 in its normal position, conductor 14, segment 15. and upon the revolution of the brush arm 51 of a transmitting distributor 16, the segment 15 and collector ring 17 are bridged thereby and a negative impulse is transmitted through conductor 18. line 19 associating the two stations, conductor 20, collector ring 21 of a rotary receiving distributor 22, brush arm 52, segment 23, polarized relay 24 to ground, causing the armature of the polarized relay 24 to move to its open circuit position. When it is desired to start a converter unit switch 7 is operated and with this switch in its operated position, positive current flows over the circuit above described causing the polarized relay 24 to reverse the position of its armature which closes the circuit of relay 2 which in turn closes the circuit of electromagnetic switch 1. Upon the energization of the relay 2, its inner right-hand front contacts close and hold the relay operated.

The electromagnetic switch remains closed and is adapted to be opened only upon the operation of relay 3 which is controlled by the relay 5 or over a circuit hereinafter described which is controllable from station A.

An answer back or supervisory circuit is also controlled by the operation of relay 2 for the purpose of indicating to the operator the position of switch 1. Wnen relay 2 is energized, positive current is supplied through the outer right-hand front contacts of relay 2 to a conductor 103, segment 104 of a rotary transmitting distributor 29, brush arm 58 and collector ring 30 of the transmitter 29, conductor 31, line 19, conductor 32, collector ring 33 of a rotary receiving distributor 34, brush arm 63, segment 35, conductor 36, and polarized relay 37 to ground. A condenser 101 bridged about relay 37 supplies additional and supplementary force to the actuating impulses. The positive impulse sent over this path causes polarized relay 37 to move its armature to a position closing a circuit through contact 38 from ground through a lamp 39 to a source of current 40. The supervisory system including lamps 39 and 43 is provided to indicate the condition of the relay 2 and consequently the position of switch 1. The lighting of lamp 39 indicates that the relay 2 has operated and that switch 1 is about to start its associated rotary converter. When relay 2 is not energized, lamp 43 is illuminated which indicates also that the converter associated therewith is not operating. Lamp 43 is controlled by polarized relay 37 through its contacts 59 under the influence of negative current associated with the outer right-hand contacts of relay 2 in its unoperated position. An energizing circuit for electromagnet 10 is also closed by the armature of relay 37 and its contact 38, and the catch mechanism 9 is thereupon operated to release the starting switch 7. Upon the release of switch 7, negative current traverses the circuit as above described to energize polarized relay 24, opening the contacts thereof, and leaving relay 2 locked up to be released by the energization of relay 3 either by means of relay 5 or an additional circuit described below which controls relay 3 from the controlling station A.

Switch 8 is provided at the control station to hold relay 24 in its circuit closing position. By means of this switch, the operator may keep the electromagnetic switch 1 closed except at such times as relay 5 operates to release it. Upon release of relay 5, switch 1 immediately closes and starts the rotary converter again.

To stop the rotary converter 11 associated with switch 1, switches 42 and 49 located at station A are provided which control the operation of relay 3 which, as previously described, controls the position of switch 1, adapted to close a circuit from a source of current 105 through the supervisory lamp 106, conductor 44, the contacts of the switch 42, relay 45 and conductor 46 to ground, causing an energization of relay 45 which thereupon locks up through its contacts 47. Lamp 106 is not lighted over the previously described circuit, since the current is insufficient while the resistance of relay 45 is included therein. Positive current is supplied at the contacts 48 of the relay 45, through switch 49, segment 50, brush 51, collector ring 17 of the transmitting distributor 16, conductor 18, line 19, conductor 20, collector ring 21, brush arm 52 and segment 53 of the receiving distributor 22, and polarized relay 54 to ground. The positive impulse thus supplied to the polarized relay 54 causes it to attract its armature and close the circuit of relay 3. The energization of relay 3 opens the circuit of relay 2, at contact 102. This, of course, causes the opening of the circuit of switch 1 and stops the converter, if previously operating.

A supervisory system for indicating the condition of relay 3 and consequently the position of switch 1 and the rotary converter unit 11, is provided and is controlled through the inner right-hand contacts of relay 3 which close a circuit from a source of positive current through conductor 27, segment 28, brush arm 58, and collector ring 30 of transmitting distributor 29, conductor 31, line 19, conductor 32, collector ring 33, brush arm 63 and segment 107 of receiving distributor 34, polarized relay 108, to ground. When energized, polarized relay 108 closes the circuit of lamp 106, which lights and indicates the operation of relay 3 and the consequent stopping of the converter 11.

The ground return for the battery current through the lamp 106 and the armature of the polarized relay 108, serves to short-circuit the relay 45, causing it to release. The release of relay 45 removes the current of positive polarity from the line and substitutes negative current therefor which, taking the path as before described, causes polarized relay 54 to open the circuit of relay 3, placing the switch 1 again in its normal condition for automatic operation. When relay 3 is in its normal position, negative current is supplied through its inner right-hand contacts over the circuit just described including the distributors 29 and 34 to polarized relay 108 to close the circuit of lamp 109 which lights and indicates to the operator that switch 1 is conditioned for automatic operation.

At times it may be desirable that the operator be able to hold switch 1 deenergized and the rotary converter 11 out of operation. For this purpose there is provided a switch 49 located at station A, which, when operated, is not automatically released and to maintain polarized relay 54 in position to keep relay 3 energized and switch 1 deenergized. In this manner, the electromagnetic switch 1 may be prevented from operating either through switches 7 and 8 or through relay 4.

The rotary distributor sets, one of which comprises the transmitter 16 and the receiver 22, and the other of which comprises the transmitter 29 and the receiver 34 are operated alternately and in the manner described in the aforementioned application of Joseph C. Field and which is briefly as follows: When the brush arms of all the distributors stand in the position indicated in the drawing, current is supplied to the release magnet 60 of distributor 16 which current flows to ground through conductor 61, segment 62, brush arm 63 and segment 64 of distributor 34, conductor 65, segment 66, brush arm 51 and collector ring 17 of distributor 16, conductor 18, line 19, conductor 31, collector ring 30, brush arm 58 and segment 67 of distributor 29, conductor 68, segment 69, brush arm 52, segment 70 and release magnet 71 of distributor 22. The release magnets 60 and 71 are energized in series over this circuit and release brush arms 51 and 52 of the distributor set comprising the transmitter 16 and the receiver 22. These brush arms are driven at the same speed and revolve until they reach the next to the last segments of their contact rings, when they establish a circuit for releasing the distributor set comprising transmitter 29 and receiver 34, which may be traced from a source of current, through the release magnet 73, conductor 74, segment 75, brush arm 51 and collector ring 17 of distributor 16, conductor 18, line 19, conductor 20, collector ring 21, brush arm 52 and segment 76 of distributor 22, conductor 77, release magnet 78 to ground. The release magnets 73 and 78 in energizing release brush arms 63 and 58 which synchronously complete a revolution and close the previously described circuit for energizing release magnets 60 and 71 which free brush arms 51 and 52. It will be understood that since the brush arms 63 and 58 of distributors 34 and 29 were released and immediately started rotating when brush arms 51 and 52 of distributors 16 and 22 arrived upon segments 75 and 76, respectively, that the energizing circuit of release magnets 60 and 71 is broken as brush arms 63 and 58 rotate past segments 62, 64 and 30, 67, respectively. Hence, when magnets 60 and 71 are deenergized, their respective latch armatures drop back and stop the rotation of brush arms 51 and 52. As soon as the brush arms 63 and 58 of distributors 34 and 29 make one complete revolution and return to the position shown in the drawing, they again bridge segments 62, 64 and 30, 78, thus energizing release magnets 60 and 71 over the circuit described above, and permitting brush arms 51 and 52 of distributors 16 and 22 to make another complete revolution. While the brush arms of distributors 16 and 22 are rotating, the brush arms of distributors 34 and 29 are at a standstill, the energizing circuit of their release magnets 73 and 78 being open at segments 75 and 70. This operation is continuously repeated so that current impulses are sent first from the switches 7, 42, or their corresponding switches 8 and 49, to the controlling apparatus for the switch 1, and then return impulses are sent through the contacts of relays 2 and 3 to operated polarized relays 37 and 108 to control the signal lamps associated therewith and the release mechanism for switches 7 and 42. By means of these intercontrolling distributor sets, the confusion of controlling answer-back signals is averted.

In order to enable the operator to listen to the rotary converter 11 as its starts, stops, or is in operation, a switch 79 is provided which is associated with a source of positive or negative current, and completes a circuit through conductor 86, segment 81, brush arm 51 and collector ring 17 of distributor 16, conductor 18, line 19, conductor 20, collector ring 21, brush arm 52 and segment 82 of distributor 22, conductor 83, and polarized relay 84 to ground. When the polarized relay 84 is energized with positive current, a circuit is established which may be traced from one side of battery 87, primary of induction coil 110, conductor 85, contacts of relay 84, conductor 89, a sensitive transmitter 88, back to the other side of battery 87. This circuit is opened when the polarized relay 84 is energized by impulses of negative polarity. The transmitter 88 is located adjacent the rotary converter 11 and the varying current generated in the said transmitter causes an induced current in the secondary winding 90 of the induction coil, which is transmitted over the line 19 through the loud speaking receiver 91 located at the control station A, returning by ground through condenser 92 to the secondary winding 90. Condenser 92 is included in the circuit with the secondary 90 to prevent the flow of direct current in this circuit and the grounding of line 19. Inductances 93 and 94 and condensers 95 and 96 are associated with the line 19 to prevent the flow of current from the transformer secondary 90 into the circuits at either station. The circuit of the transmitter 88 is closed also upon the operation of relay 2 through the outer left-hand contacts thereof. Thus, whenever switch 1 is operated by means of the relay 2, the circuit of the transmitter 88 is closed and the attendant at the controlling station will be able to hear through the medium of the loud speaking receiver 91, the starting of the rotary converter. Likewise, when relay 3 operates to stop the rotary converter, its left-hand contacts close the circuit of the transmitter 88, and the sound of the converter in stopping will be audible at the loud speaking receiver 91.

Briefly summarizing the operation of the system as a whole, the controlling station A and the remote station B are joined by means of a single line conductor 19. A set of rotary distributors comprising transmitting distributor 16 and receiving distributor 22 are associated with the line 19 at the controlling and remote stations, respectively, and are operated in synchronism for the purpose of transmitting controlling impulses from the station A to station B. A similar pair of rotary distributors comprising transmitting distributor 29 and receiving distributor 34, are also associated with the common line 19 at the remote station and at the controlling station, respectively, for the purpose of transmitting answer-back impulses from station B to station A. Upon the operation of control switch 7 at station A, as described above, a circuit is completed through the medium of distributors 16 and 22 and line conductor 19 for operating polarized relay 24 with a current of positive polarity. This operation of relay 24 closes an energizing circuit for relay 2 which, in energizing, closes a circuit for the electromagnetic switch 1. Switch 1 in operating, closes an energizing circuit for the converter 11. Upon the operation of the relay 2, its back contacts close an answer-back circuit for operating polarized relay 37 at station A through the medium of rotary distributors 29 and 34 and line 19. Relay 37 in operating, extinguishes the lamp 43 and lights the lamp 39, thereby indicating the changed condition of relay 2. The relay 37 at station A, in operating, also completes an energizing circuit for the magnet 10 which attracts its latch armature and releases the locking device 9, thus returning the control switch 7 to the normal position shown in the drawing. If it is now desired to stop the operation of the rotary converter 11, the switch 42 at station A is closed, thereby energizing the polarized relay 54 at station B over a circuit which includes distributors 16 and 22 and line 19. Relay 54 in operating, completes an energizing circuit for relay 3 which, in turn, opens the energizing circuit of the relay 2 and thereby opens electromagnetic switch 1. The switch 1 in opening, stops the operation of the converter 11. Upon the operation of the relay 3, an answer-back signal is transmitted over the line 19 through the medium of distributors 29 and 34 to operate polarized relay 108. Relay 108 in operating, extinguishes lamp 109 and lights lamp 106, thus indicating the fact that relay 3 is energized. The relay 108 in energizing, also short circuits the relay 45 which was previously locked up through its armature, and thus the armatures of this relay are returned to their normal positions. The operator at station A, by means of the key 79, may operate the polarized relay 84 at the station B and thereby complete a circuit which includes the transmitter 88 at station B and the loud speaker 91 at station A, by means of which the operator may listen to sound of the converter 11 in starting and stopping. In addition to the means provided for controlling the converter 11 from the controlling station A, this device may, as previously pointed out, be operated automatically at the remote station B. Thus, when the relay 4 is operated by circuit conditions on the third rail which the converter 11 is adapted to feed, a circuit will be established for the relay 2 which, in energizing, will operate the electromagnetic switch 1 and hence close the circuit of the converter 11. When, on the other hand, the relay 5 is operated when a condition of low load or high voltage exists on the line, it establishes an operating circuit for the relay 3 which, in operating, opens the energizing circuit of the relay 2 and hence deenergizes the electromagnetic switch 1 and stops the operation of the converter 11. It will be understood that an answer-back signal is transmitted over the line 19 through the medium of distributors 29 and 34 by the relays 2 and 3 whether these relays have been operated automatically or by means of the control mechanisms described above.

By the system described above the attendant at the controlling station has complete control of the unit 11 operated by the switch 1.

Only one unit has been illustrated and described. It is intended however that additional units be controlled over line 19 by connecting controlling apparatus in exactly the same manner as above described to other segments of the rotary distributors since only two segments are employed for the controlling apparatus of one unit. It is also understood that if it is desired that switch 1 control electrical or mechnical apparatus other than the rotary converters referred to in this description, this can be accomplished without any alteration in the system of the invention.

What is claimed is:

1. In a remote control and supervisory system, a controlling station and a remote station, a device located at the remote station to be controlled from the controlling station, two pairs of switching devices operated alternately in synchronism, means operable at the controlling station to control said device through the medium of one pair of said switching devices, and means controlled by the operation of said device for automatically restoring said means to its non-controlling conditions through the medium of the second pair of said switching devices.

2. In a remote control and supervisory system for power lines, a controlling station and a remote station, a single line wire connecting said stations, a device at said remote station, means controlled by the power line voltage for automatically operating said device, switching devices associated with the line at both stations, means for controlling said device over said line wire through the medium of said switching devices, and means controlled through the medium of said switching devices over said line wire for preventing the operation of said device by said automatic means.

3. In a remote control and supervisory system for power lines, a controlling station and a remote station, a single line wire connecting said stations, a device at said remote station, means controlled by the power line voltage for automatically operating said device, two pairs of switching devices operated alternately in synchronism associated with the line at both stations, means for controlling said device through the medium of one pair of said switching devices over said line wire, means controlled through the medium of the first pair of said switching devices over said line wire for preventing the operation of said device by said automatic means, and a supervisory signal at said controlling station controlled by the device at said remote station through the medium of the second pair of said switching devices over said line wire.

4. In a remote control and supervisory system for power lines, a controlling station and a remote station, a single line wire connecting said stations, a device at said remote station, means operable at said controlling station to control said device over said line wire, means controlled by the operation of said device for automatically restoring said means to its non-controlling condition and for giving a supervisory signal at said controlling station controlled over said line wire by said device.

5. In a remote control and supervisory system for power lines, a controlling station and a remote station, a single line wire connecting said stations, a switch at said remote station, means controlled by the power line voltage for automatically opening and closing said switch, means controlled at said controlling station and operable over said line wire for closing said switch, means controlled at said controlling station and operable over said line wire for opening said switch, means controlled at said controlling station and operable over said line wire to prevent the operation of said switch by said automatic means, and a supervisory signal at said controlling station controlled over said line wire by said switch.

6. In a remote control and supervisory system for power lines, a controlling station and a remote station, a single circuit connecting said stations, a switch at said remote station, a pair of relays at said remote station for respectively opening and closing said switch, means operable over said circuit for operating each of said relays from said controlling station, means controlled by the power line voltage for automatically operating said relays, means controlled at said controlling station and operable over said circuit for preventing the operation of said relays by said automatic means, supervisory signaling devices at said controlling station, and means controlled by said relays for selectively operating said signaling devices over said circuit.

7. In a remote control and supervisory system, a controlling station and a remote station, a single circuit connecting said stations, a rotary converter at said remote station, a power line to which said converter is connected, a telephone transmitter associated with said converter, a telephone receiver at the control station, means controlled by the load conditions of said power line to start or stop said converter and to close the transmitter circuit, and a circuit connecting the transmitter and the receiver including said circuit connecting said stations.

In witness whereof, I hereunto subscribe my name this 29th day of November, A. D., 1921.

JOHN B. HARLOW.